(12) United States Patent
Leist et al.

(10) Patent No.: US 8,807,235 B2
(45) Date of Patent: Aug. 19, 2014

(54) SOIL TREATING SYSTEM AND SHEARING ASSEMBLY

(75) Inventors: James R. Leist, Columbus, MS (US); Howard Duzan, Columbus, MS (US)

(73) Assignee: Weyerhaeuser NR Company, Federal Way, WA (US)

( * ) Notice: Subject to any disclaimer, the term of this patent is extended or adjusted under 35 U.S.C. 154(b) by 0 days.

(21) Appl. No.: 13/309,214

(22) Filed: Dec. 1, 2011

(65) Prior Publication Data

US 2012/0145420 A1 Jun. 14, 2012

Related U.S. Application Data

(60) Provisional application No. 61/421,137, filed on Dec. 8, 2010.

(51) Int. Cl.
*A01B 5/00* (2006.01)
*A01B 49/02* (2006.01)
*A01B 77/00* (2006.01)

(52) U.S. Cl.
CPC ..................................... *A01B 77/00* (2013.01)
USPC ........................................... 172/145; 172/32

(58) Field of Classification Search
USPC ........... 172/145, 146, 780, 32, 779, 192, 197, 172/188; 37/221; 111/104, 100, 200, 900; 144/335, 4.1, 34.1; 56/229
See application file for complete search history.

(56) References Cited

U.S. PATENT DOCUMENTS

| | | | |
|---|---|---|---|
| 1,522,331 A * | 1/1925 | Schaeffer ...................... 172/393 |
| 2,747,354 A * | 5/1956 | Bloser ........................... 171/118 |
| 2,994,142 A | 8/1961 | Newll et al. |
| 3,415,296 A | 12/1968 | Frankenberg et al. |
| 3,635,269 A | 1/1972 | Price |
| 3,868,063 A | 2/1975 | Slaker |
| 3,880,216 A | 4/1975 | Anderson et al. |
| 3,915,239 A * | 10/1975 | Hendrichon ................... 172/146 |
| 4,056,328 A * | 11/1977 | Maxey ............................. 404/96 |
| 4,058,913 A * | 11/1977 | Esquilat .......................... 37/219 |
| 4,223,846 A | 9/1980 | Priepke |
| 4,274,457 A | 6/1981 | Nilsen |
| 4,353,421 A | 10/1982 | Lahti |
| 4,537,362 A | 8/1985 | Zuloaga |
| 4,836,295 A * | 6/1989 | Estes ............................ 172/146 |
| 4,967,545 A * | 11/1990 | Fischer et al. ................. 56/12.9 |
| 5,680,715 A * | 10/1997 | Thiboutot et al. .............. 37/219 |
| 6,119,792 A * | 9/2000 | Almer ........................ 172/799.5 |
| 6,454,018 B2 * | 9/2002 | Tozer .............................. 172/29 |
| 6,463,722 B1 * | 10/2002 | de Groot ........................ 56/12.9 |
| 6,904,979 B1 * | 6/2005 | Confoey ..................... 172/799.5 |
| 7,412,932 B1 | 8/2008 | Bigelow et al. |
| 7,600,576 B2 * | 10/2009 | Gayer ........................ 172/799.5 |
| 7,726,250 B2 | 6/2010 | Duzan et al. |
| 2006/0118313 A1 | 6/2006 | Nicholas |
| 2006/0242898 A1 | 11/2006 | Peiffer |
| 2008/0172265 A1 | 7/2008 | Crane et al. |
| 2008/0236463 A1 | 10/2008 | Bigelow et al. |
| 2009/0242077 A1 | 10/2009 | Prohaska |

* cited by examiner

*Primary Examiner* — Árpád Fábián-Kovács
(74) *Attorney, Agent, or Firm* — Baker Hostetler LLP (57) ABSTRACT

Soil treating systems and shearing assemblies for use in forestry operations are described. Embodiments of soil treating systems include a movement assembly having a front end and a back end, a shearing assembly mounted on the front end of the movement assembly, and leveling assembly mounted on the back end of the movement assembly. In some embodiments shearing assemblies are inverted V-type shearing assemblies. Further aspects described are directed towards methods for using soil treating systems and shearing assemblies for preparing land for interplanting an energy crop with a primary crop.

19 Claims, 8 Drawing Sheets

SOIL TREATING SYSTEM AND SHEARING ASSEMBLY

CROSS-REFERENCE TO RELATED APPLICATIONS

This application is entitled to and claims the benefit of priority under 35 U.S.C. §119 from U.S. Provisional Patent Application Ser. No. 61/421,137 filed Dec. 8, 2010, and titled "Soil Treating System and Shearing Assembly," the contents of which are incorporated herein by reference.

This application relates to U.S. patent application Ser. No. 13/309,180, filed on the same day as the present patent application, and titled "Method for Interplanting Energy Crops," the contents of which are incorporated herein by reference.

TECHNICAL FIELD

The present disclosure is directed generally to soil treating systems and shearing assemblies for interplanting a primary crop and an energy crop.

BACKGROUND

Due to diminishing quantities of coal, petroleum, and natural gas products, attention is being directed to other energy sources, including oil shale, solar energy, and nuclear energy. One source receiving considerable attention is forest biomass materials such as wood, plants grown in conjunction with trees, and wood byproducts. Forest biomass may include any type of biomass produced by forest growth such as dead trees, non-merchantable trees, branches, understory, tree stumps, interplanted crops, other plants grown with trees, clippings, logging residue, stems, wood chips, or other similar material. Forest biomass has the potential for use in countless different applications including but not limited to generating heat, production of liquid fuel, production of biogas, generating bioelectricity, and production of feedstock for chemicals and other materials.

Some forestry companies have experimented with interplanting regenerating lignocellulosic energy crops with various types of trees crops for production of forest biomass. See, for example, U.S. Pat. No. 7,412,932, the contents of which is hereby incorporated by reference. As the demand for alternative energy sources continues to increase, there is also an increasing demand for new and innovative methods and equipment for producing forest biomass in conjunction with timberlands. Conventional agriculture equipment and methods are often not appropriate for the rough terrain (e.g., humps and swales), stumps, sticks, and other debris encountered in forestry operations. At the same time, the demands of modern forestry require that timberlands be managed at intense levels so as to produce maximum growth in the shortest period of time. Many of these intense practices can have a negative impact on soil, water quality, and greenhouse gas emissions. Accordingly, there is a need to develop new silviculture practices to enable growth of energy crops in conjunction with other crops whilst minimizing negative impacts on the environment.

SUMMARY

The following summary is provided for the benefit of the reader only and is not intended to limit in any way the invention as set forth by the claims. The present disclosure is directed generally towards soil treating systems and shearing assemblies for use in forestry operations.

Embodiments of soil treating systems according to the disclosure include a movement assembly having a front end and a back end, a shearing assembly mounted on the front end of the movement assembly, and leveling assembly mounted on the back end of the movement assembly. In some embodiments shearing assemblies are inverted V-type shearing assemblies. Further aspects of the disclosure are directed towards methods for using soil treating systems and shearing assemblies for preparing land for interplanting an energy crop with a primary crop.

BRIEF DESCRIPTION OF THE DRAWINGS

The present disclosure is better understood by reading the following description of non-limitative embodiments with reference to the attached drawings wherein like parts of each of the figures are identified by the same reference characters, and are briefly described as follows.

DETAILED DESCRIPTION

The present disclosure describes soil treating systems and shearing assemblies for use in forestry operations. Certain specific details are set forth in the following description and FIGS. 1-8 to provide a thorough understanding of various embodiments of the disclosure. Well-known structures, systems, and methods often associated with such systems have not been shown or described in detail to avoid unnecessarily obscuring the description of various embodiments of the disclosure. In addition, those of ordinary skill in the relevant art will understand that additional embodiments of the disclosure may be practiced without several of the details described below.

In this disclosure, the term "plantation site" is used to refer to an established forest, farm, or estate where a crop is grown. The term "primary crop" is used to refer to any type of tree crop known to a person of ordinary skill in the art. The term "energy crop" is used to refer to a regenerating crop harvested for the production of heat, electric power, other combustible power, and/or for conversion to transportation fuels and other useful energy products (e.g., ethanol). The term "plantation debris" is used to refer to any debris commonly encountered in forest operations including but not limited to stumps, sticks, twigs, and root balls.

Figure 1:
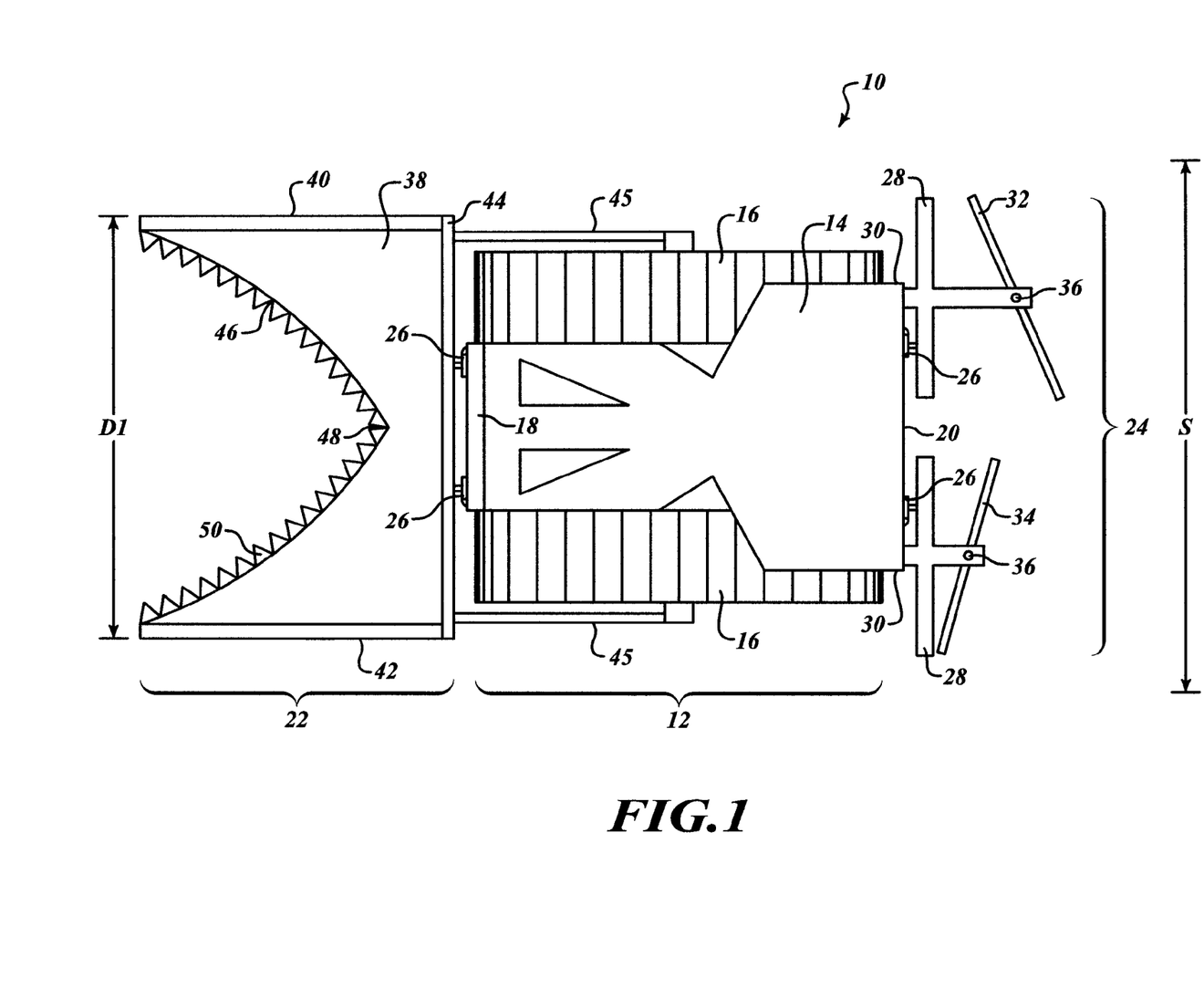
FIG. 1 is a top view of a soil treating system according to embodiments of the disclosure.
Figure 2:
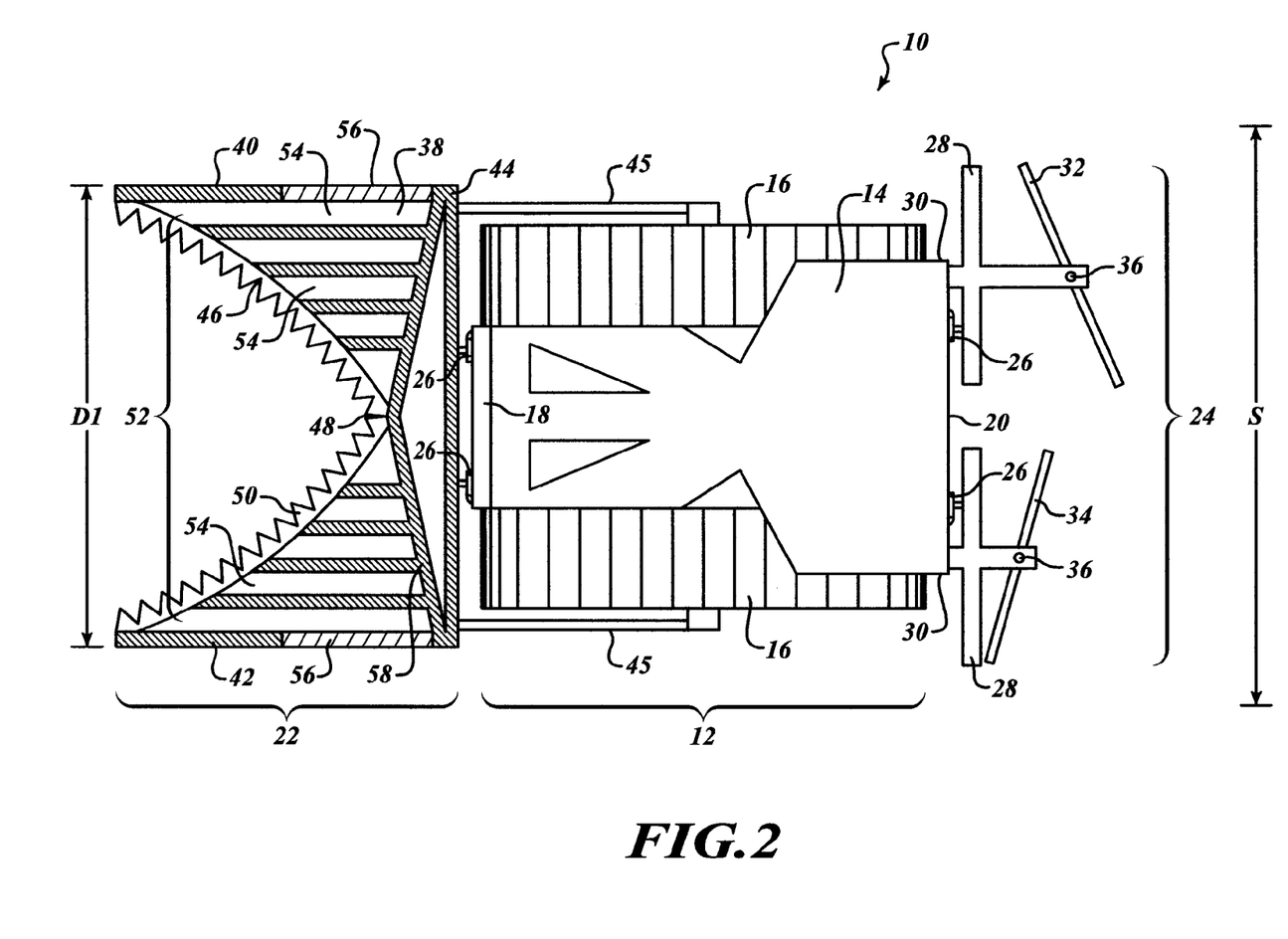
FIG. 2 is a top view of another soil treating system according to embodiments of the disclosure.
Figure 3:
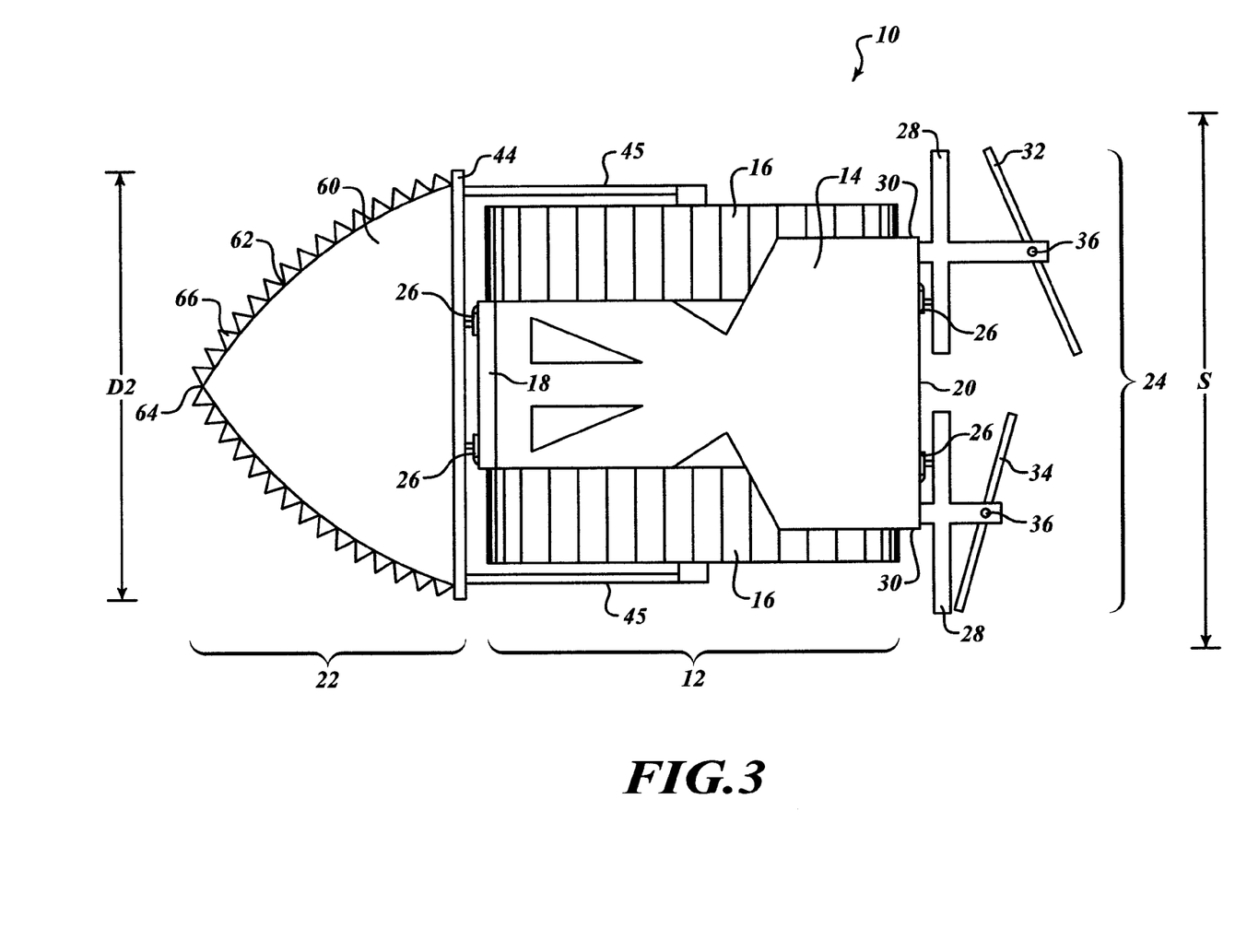
FIG. 3 is a top view of another soil treating system according to embodiments of the disclosure.

FIGS. 1-3 illustrate various embodiments of soil treating systems 10 for use in preparing plots of land for interplanting a primary crop and an energy crop. Soil treating systems 10 according to embodiments of the disclosure generally include a movement assembly and a shearing assembly. In some embodiments, the soil treating system may also include a leveling assembly. Specific configurations and components of soil treating systems 10 according to the disclosure will now be described in detail.

Referring to FIGS. 1-3, a top view of the soil treating system 10 according to embodiments of the disclosure is shown. In some embodiments, the soil treating system 10 includes a movement assembly 12. The movement assembly 12 is not described in detail in this disclosure because it may be any type of vehicle or carrier known to a person of ordinary skill in the art that is suitable for the operations described in the disclosure. In FIG. 1, the movement assembly 12 has a base 14 (e.g., a tractor cab) and a propulsion mechanism 16 (e.g., treads or wheels). A person of ordinary skill in the art will appreciate that various types of movement assemblies (e.g., tractors, prime movers) are suitable for use with systems and methods according to the disclosure.

Referring again to FIGS. 1-3, the movement assembly 12 has a front end 18 and a back end 20. In some embodiments, a shearing assembly 22 may be mounted on the front end 18 of the movement assembly 12. In some embodiments, a leveling assembly 24 may be mounted on the back end 20 of the movement assembly 12. Some embodiments of soil treating systems 10 according to the disclosure include both a shearing assembly 22 and a leveling assembly 24. Some embodiments include only a shearing assembly 22 and no leveling assembly 24. Likewise, some embodiments include only a leveling assembly 24 and no shearing assembly 22. Further, shearing assemblies 22 and/or leveling assemblies 24 according to the disclosure may combined with conventional equipment known to a person of ordinary skill in the art.

Shearing assemblies 22 and leveling assemblies 24 according to embodiments of the disclosure may be attached to the movement assembly 12 via one or more connection mechanisms 26 such as hitches, hooks, or other towing and/or hauling equipment known to a person of ordinary skill in the art. In some embodiments, shearing assemblies 22 and leveling assemblies 24 may be detachable from the movement assembly 12. Accordingly, methods according to embodiments of the disclosure may be performed with the shearing assembly 22 and/or leveling assembly 24 attached to or detached from the movement assembly 12 as appropriate.

Leveling assemblies 24 according to embodiments of the disclosure may generally include one or more mounting assemblies 24 attached to the back end 20 of the movement assembly 12. In some embodiments, a portion of the one or more mounting assemblies 28 may also be connected to and/or supported by one or more sides 30 of the movement assembly 12. In addition, other types of mounting assemblies known to a person of ordinary skill in the art may be substituted for the configuration explicitly shown.

In some embodiments, one or more grading devices (e.g., a first grading device 32 and a second grading device 34) are attached to each of the one or more mounting assemblies 28. Grading devices suitable for use with embodiments of the disclosure include, but are not limited to rakes, blades, or other devices known to a person of ordinary skill in the art as suitable for leveling terrain. FIGS. 1-3 show the grading devices rotatably attached via hinge points 36; however, numerous other attachment mechanisms known to a person of ordinary skill in the art are envisioned to be within the scope of this disclosure. For example, in some embodiments, one or more mud flaps (not shown) may be attached to the one or more mounting assemblies 28 and/or the one or more grading devices. If the mud flap is arranged in a configuration that is substantially perpendicular to the terrain, it may be effective to further advance smoothing and leveling of the soil.

In some embodiments, the first grading device 32 may be disposed angularly with respect to the second grading device 34 to effect leveling, smoothing, and/or grading of the terrain as the soil treating system 10 moves. Grading devices according to embodiments of the disclosure may have varying lengths and/or widths. In some embodiments, leveling assemblies 24 may span a distance S from approximately 10 feet to approximately 12 feet. Configurations of grading devices other than those explicitly shown may also be used. As a non-limiting example more than two grading devices attached in a different configuration that is effective to grade soil are within the scope of the disclosure. Further, use of a single grading device is envisioned to be within the scope of the disclosure.

FIGS. 1-3 illustrate different embodiments of shear assemblies 22 according to embodiments of the disclosure. FIGS. 1 and 2 illustrate embodiments of inverted V-type shear assemblies 22, whereas FIG. 3 illustrates an example of a soil treatment system 10 having a non-inverted V-type shear assembly 22. Details of specific embodiments of the disclosure will now be described with reference to FIGS. 1-3 as appropriate.

Referring to FIGS. 1 and 2, the soil treatment system 10 is shown having a shear assembly 22 that includes a frame 38 having two opposing parallel sides (e.g., a first side 40 and a second side 42). In some embodiments, the frame 38 is mounted on the movement assembly 12 so that the first side 40 and the second side 42 are substantially perpendicular to the front end 18 of the movement assembly 12. The first side 40 and the second side 42 are separated by a distance D1 that may be approximately 10 feet to approximately 12 feet. A bar 44 may be arranged between the two opposing sides and attached via the one or more connection mechanisms 26 in a configuration so that it is substantially parallel with the front end 18 of the movement assembly 12. In some embodiments, one or more supports 46 may connect the bar 44 to a portion of the propulsion mechanism 16, thereby holding the shear assembly 22 near a soil surface on the terrain.

In some embodiments, a substantially V-shaped cutting blade 48 having an apex 50 may be arranged between the first side 40 and the second side 42 of the frame 38. In FIGS. 1 and 2, the cutting blade 48 is arranged so that it is substantially parallel with the terrain and the apex 48 points toward the bar 44, thereby forming an inverted V. The cutting blade 48 may include a plurality of serrated teeth 50 suitable for cutting and/or lifting plantation debris and soil. A person of ordinary skill in the art will appreciate that FIGS. 1 and 2 are schematic in nature and are not intended to depict a particular number of teeth 50 or shape for each of the teeth 50.

In addition to the components described above, shearing assemblies 22 according to embodiments of the disclosure may include additional features for optimizing soil for planting of energy crops. Referring to FIG. 2, a non-limiting example of a filtering mechanism 52 is shown mounted on the frame 38. In some embodiments, the filtering mechanism 52 may be arranged behind the cutting blade 48. The filtering mechanism 52 may be a screen, a grate, or any other device suitable for separating materials. In some embodiments, the filtering mechanism 52 has one or more openings 54 that are sized so that soil is allowed to pass through, but plantation debris is retained on the filtering mechanism 52. As the soil treating system 10 moves, the retained plantation debris may be discharged via one or more plantation debris discharge devices 56. Plantation debris discharge devices 56 suitable for systems according to embodiments of the disclosure include but are not limited to vents, tubes, chutes, or other suitable devices for removing material from a surface.

Some shear assemblies 22 according to embodiments of the disclosure may also include a deflector 58 mounted on the frame 38. The deflector 58 may be attached to the frame 38 behind and/or around the filtering mechanism 52 in a configuration effective to deflect soil and plantation debris onto the filtering mechanism 52. In embodiments without a filtering mechanism 52, the deflector 58 may be used to deflect soil towards the cutting blade 48 and to deflect plantation debris towards the sides (the first side 40 and/or the second side 42) of the frame 38. In FIG. 2, the deflector 58 is depicted as a slanted blade arranged in a configuration that is substantially perpendicular to the soil filtering mechanism 52. A person of ordinary skill in the art will appreciate that any type of device suitable to direct soil and plantation debris may be suitable for use as a deflector 58.

Referring to FIG. 3, a soil treatment system 10 having a non-inverted V-type shear assembly 22 is shown. The shear assembly 22 includes a blade mounting assembly 60 connected to the movement assembly 12 via one or more connection mechanisms 26. A substantially V-shaped serrated cutting blade 62 having an apex 64 may be arranged on the blade mounting assembly 60 so that the apex 64 points towards to the front end 18 of the movement assembly 12. In some embodiments, the cutting blade 62 has a plurality of teeth 66 and is effective to clear a distance D2 that may be approximately 10 feet to approximately 12 feet. Cutting blades 62 having configurations other than those explicitly shown in FIG. 3 are also envisioned to be within the scope of the disclosure. A person of ordinary skill in the art will appreciate that FIG. 3 is schematic in nature and is not intended to depict a particular number of teeth 66 or shape for each of the teeth 66.

Figure 4:
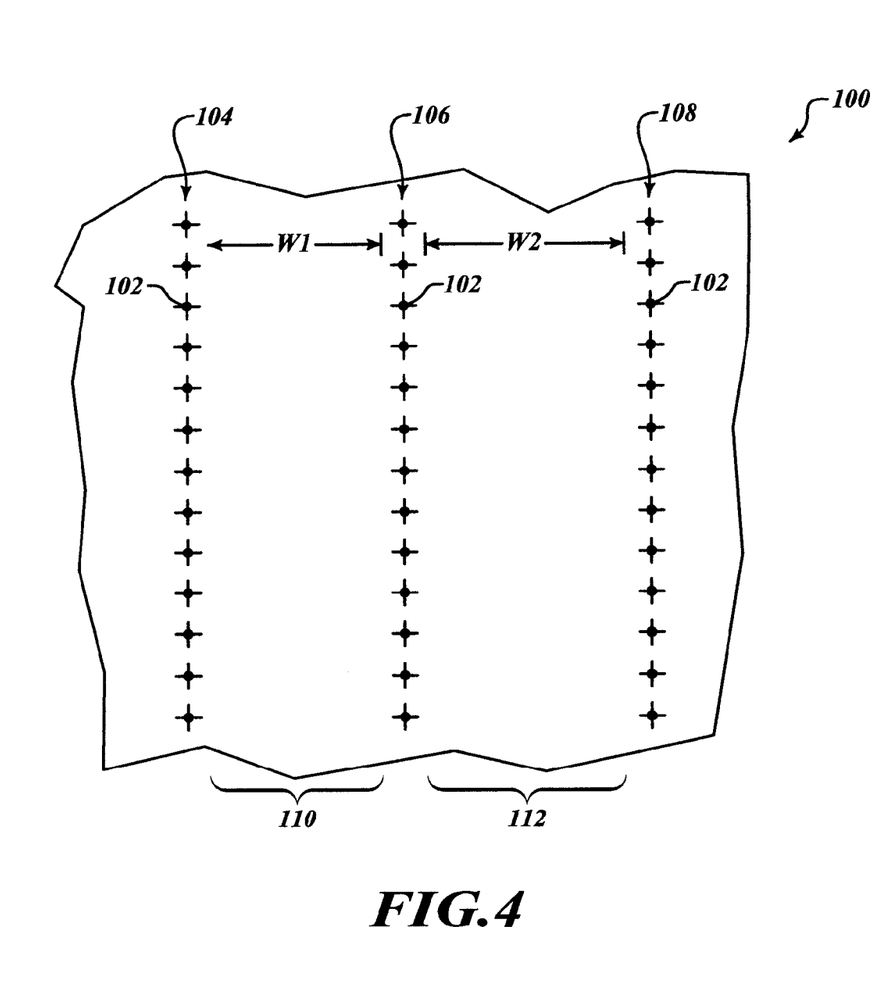
FIG. 4 is a plan view of a plot of land after plantation of a primary crop according to embodiments of the disclosure.

Methods for using systems according to embodiments in forestry operations will now be described in detail. FIGS. 4-8 show plan views of a plot of land 100 on a plantation site over various time periods as it is treated and managed using systems and methods according to embodiments of the disclosure. Referring to FIG. 4, a primary crop 102 may be planted in a first row 104, in a second row 106, and in a third row 108 on the plot 100. It should be appreciated that the number of crop units (e.g., trees) of the primary crop 102 planted and the number of rows seen in FIGS. 4-8 are merely for illustrative purposes. In that regard, the number of crop units in a row and the number of rows in a plot can be configured in a repeating pattern over any sized area, such as one or more acres of land.

Referring back to FIG. 4, the first row 104 and the second row 106 are shown separated by a first intermediate area 110 having a first width W1. The second row 106 and the third row 108 are shown separated by a second intermediate area 112 having a second width W2. In some embodiments, the first width W1 and the second width W2 (shown in FIG. 5) are approximately equal to the distances D1 and D2 (shown in FIGS. 1-3). In some embodiments, D1 and D2 may be slightly smaller than W1 and W2 so that soil treating systems 10 according to the disclosure may be moved through the intermediate areas between rows.

Figure 5:
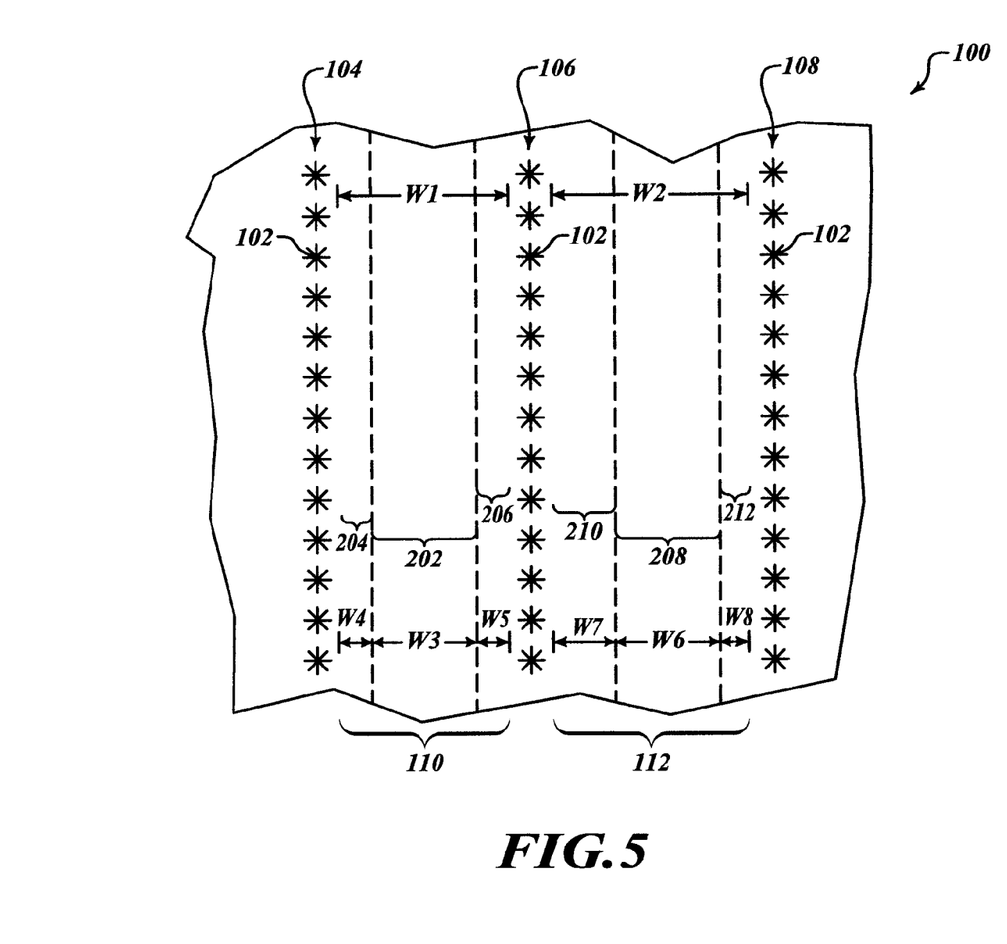
FIG. 5 is a plan view of the plot of land from FIG. 4 after the primary crop has been allowed to grow for a period of time.

Referring to FIG. 5, a plan view of the plot of land 100 on a plantation site is shown after the primary crop 102 has been allowed to grow for a period of time. In some embodiments, the intermediate area 110 may be established at the same time that the primary crop 102 is planted. For example, the rows for the primary crop 102 may be prepared, the intermediate area may be prepared, and then the both the primary crop 102 and the energy crop 602 may be planted. In some embodiments, the primary crop 102 may be permitted to grow for about 2 to about 3 years. In other embodiments, this time may be determined based on other factors such as the tree species and surrounding environment. The primary crop 102 and the energy crop 602 may also be planted at the same time to provide maximum exposure to light for the energy crop 602 before the primary crop 102 gets large enough to shade the energy crop 602. In some embodiments the energy crop 602 may be planted after the primary crop 102 has been thinned and some of the trees removed to allow for more light. Generally, this may occur around age 10 to about 15. After the primary crop 102 has reached the desired maturity, the plot 100 may now be prepared for interplanting of an energy crop.

For purposes of illustrating systems and methods according to the disclosure, FIG. 5 shows the first intermediate area 110 divided into three portions: a first center portion 202 having a third width W3, a first side portion 204 having a fourth width W4, and a second side portion 206 having a fifth width W5. Likewise, the second intermediate area 112 is shown divided into three portions: a second center portion 208 having a sixth width W6, a third side portion 210 having a seventh width W7, and a fourth side portion 212 having an eighth width W8. In some embodiments, the three portions in which the intermediate areas are divided may have substantially the same width. In other embodiments, the center portion may be substantially larger than the side portions. Further, the side portions may be different sizes.

In some embodiments, soil treating systems 10 according to the disclosure are sized to be moved or driven through the intermediate areas between rows. Accordingly, in some embodiments, the third width W3 and the sixth width W6 (shown in FIG. 5) are approximately equal to the distances D1 and D2 (shown in FIGS. 1-3). In some embodiments, D1 and D2 may be slightly smaller than W3 and W4 so that soil treating systems 10 according to the disclosure may be moved through the intermediate areas between rows. In some embodiments, D1 and D2 may be slightly larger than W3 and W4, thereby allowing a part of the soil treating system 10 to extend into one or more of the side portions.

According to embodiments of the disclosure, preparation of the plantation site includes performing a series of steps aimed at making the first intermediate area 110 and the second intermediate area 112 more suitable for planting energy crops. To simplify explanation, the following portion of the disclosure will describe such methods with reference to the first intermediate area 110; however, it should be understood that substantially the same steps may be performed on the second intermediate area 112. A person of ordinary skill in the art will also appreciate that the first intermediate area 110 and the second intermediate area 112 may be prepared according to embodiments of the disclosure at the same time or at different times.

Figure 6:
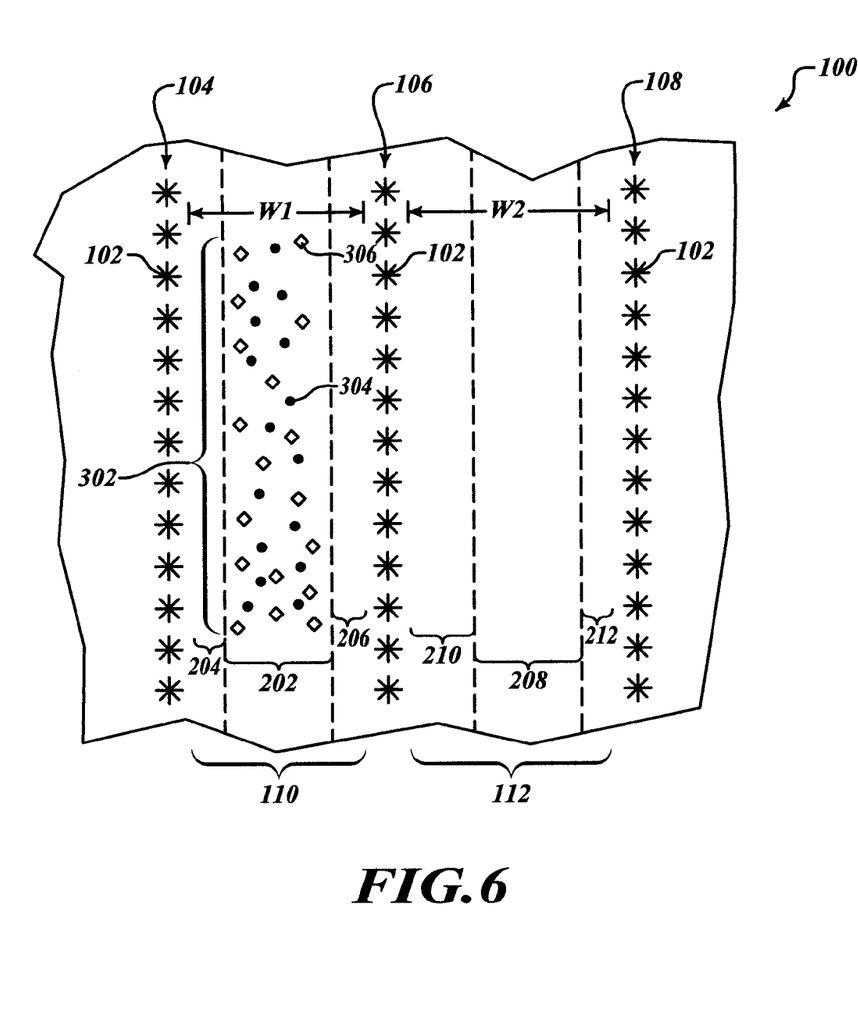
FIG. 6 is a plan view of the plot of land from FIG. 5 showing a soil and plantation debris mixture.
Figure 7:
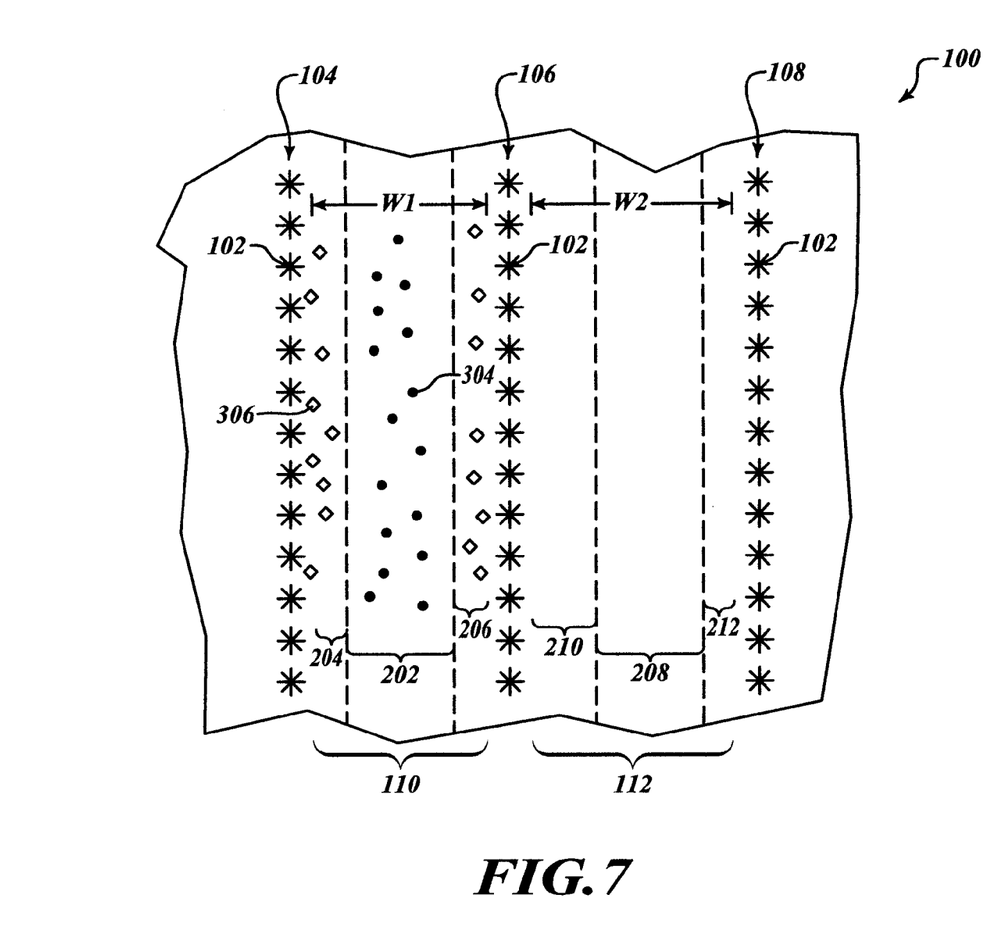
FIG. 7 is a plan view of the plot of land from FIG. 6 showing an exemplary distribution of a soil component and a plantation debris component according to embodiments of the disclosure.
Figure 8:
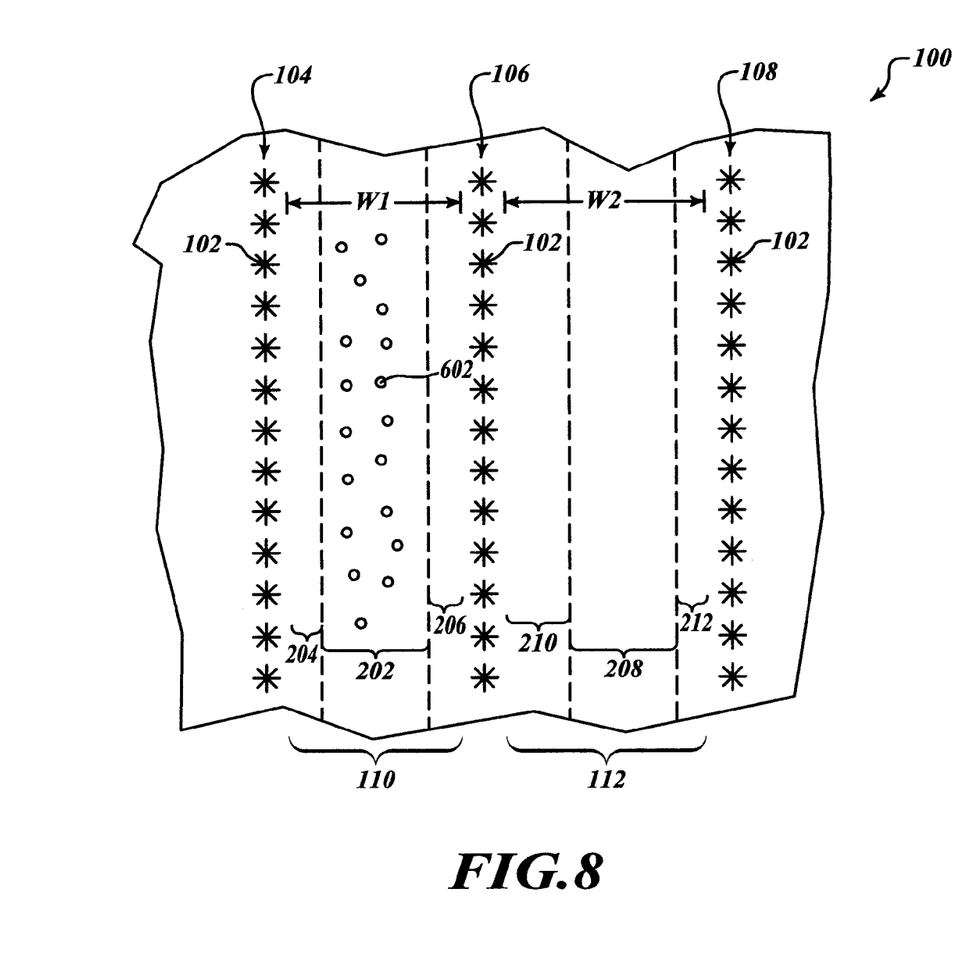
FIG. 8 is a plan view of the plot of land from FIG. 6 after the planting of an energy crop.

Referring to FIGS. 6-8, preparation methods according to embodiments of the disclosure are illustrated. FIG. 6 shows the plot 100 covered in a soil and plantation debris mixture 302. The soil and plantation debris mixture 302 will naturally be present on the plot 100 as a result of the plantation, growth, and/or harvest of the primary crop 102. The soil and plantation debris mixture 302 may consist of a soil component 304 and a plantation debris component 306 in any proportion. The soil component 304 is primarily soil (e.g., the superficial unconsolidated and usually weathered part of the mantle of the planet). The plantation debris component 306 is primarily plantation debris (e.g., any debris commonly encountered in forest operations including but not limited to stumps, sticks, twigs, and root balls). A person of ordinary skill in the art will appreciate that in many situations, the soil component 302 is not 100% soil and the plantation debris component is not 100% plantation debris. Further, in some embodiments, the soil component 304 may include a small portion of plantation debris and the plantation debris component 306 may include a small portion of soil.

Referring back to FIG. 6, methods according to embodiments of the disclosure may include two primary steps: lifting and redeposition. The lifting step may include lifting the soil and plantation debris mixture 302 from the plot 100. Referring to FIGS. 1-3, lifting of the soil and plantation debris mixture 302 may be performed by moving the shear assemblies 22 according to embodiments of the disclosure along the first intermediate area 110 in a direction substantially parallel to the primary crop 102. In some embodiments, shear assemblies 22 according to embodiments of the disclosure may be operated in a manner causing the plantation debris component 306 to be pushed to the sides of the shearing assembly 22 while soil component 304 is lifted.

After lifting, the soil and plantation debris mixture 302 may be redeposited onto the plot of land 100. Conventional redeposition techniques generally aim to push soil towards the primary crop 102 in order to encourage growth of the primary crop 102. In embodiments according to the disclosure, the soil and plantation debris mixture 302 is redeposited primarily into the first intermediate area 110, but distribution within the first intermediate area 110 considers enabling growth of an interplanted energy crop as well as the growth of the primary crop 102. For example, the soil component 304 may be directed away from the primary crop 102 during redeposition in order to prepare the first intermediate area 110 for planting of the energy crop. As shown in FIG. 7, the soil component 302 may be redeposited primarily into the first center portion 202. In some embodiments (e.g., as shown in FIG. 7), the plantation debris component 306 may be redeposited primarily into the first side portion 204 and/or the second side portion 206.

Lifting and/or redeposition according to embodiments of the disclosure may be performed, for example, using the soil treating systems 10 illustrated in FIGS. 1-3. As the movement assembly 12 passes through the first intermediate area 110, the cutting blades (46 in FIGS. 1 and 2 and 62 in FIG. 3) may be operated just below the soil surface causing the soil and plantation debris mixture 302 to be lifted and redeposited. In some embodiments, the redistribution of the soil and plantation debris mixture 302 may be controlled by mechanical means. For example, filtering mechanisms 52 (e.g., shown in FIG. 2) may be used to separate the soil and plantation debris mixture 302 into the soil component 304 and the plantation debris component 306. In some embodiments, the filtering mechanism 52 may have openings 54 that are large enough to permit passage of the soil component 302, but small enough to retain the plantation debris component 306 on the filtering mechanism 52. Accordingly, the plantation debris component 306 may then fall off the shear assembly 22 via the discharge devices 56 into the first side portion 204 and/or the second side portion 206 of the first intermediate area 110.

Redeposition of the components of the soil and plantation debris mixture 302 may further be controlled by a deflector 58 as shown in FIG. 3. Deflectors 58 according to embodiments of the disclosure may be arranged so that the soil and plantation mixture 302 is directed onto the filtering mechanism 52. In embodiments without a filtering mechanism, 52, the deflector 58 may be configured to direct the plantation debris component 306 towards the discharges devices 56. In some embodiments, lifting and redeposition according to embodiments of the disclosure is effective for preparing the first intermediate area 110 for planting energy crops without damaging roots of the primary crop 102.

In some embodiments, a leveling step may be performed on the first intermediate area 110 after redeposition of the soil component 304 and the plantation debris component 306. Leveling may be effective to change the slope of the terrain of the plot of land 100 to make it more suitable (e.g., more flat) for planting and growing energy crops. Referring to FIGS. 1-3, leveling may be performed by leveling assemblies 24 according to embodiments of the disclosure. As the movement assembly 12 passes through the first intermediate area 110, leveling assemblies 22 according to embodiments of the disclosure flatten and smooth the redeposited soil. In some embodiments, the leveling assembly 22 may also further move plantation debris components 306 into the side portions of the intermediate area. The result is a relatively flat strip with exposed mineral soil and relatively few stumps, root balls, or other debris that may cause problems while planting a corp.

After preparation of the plot 100 according to methods described above, energy crops may be interplanted with the primary crop. FIG. 8 shows energy crops 602 planted in the first intermediate area 110. For clarity, the distribution of the soil component(s) 304 and plantation debris component(s) 306 is not shown in FIG. 8. Suitable energy crops 602 are regenerating lignocellulosic energy crops, including perennial plant species such as switch grass (including *panicum virgatum* and other varieties of the genus *panicum*), *miscanthus* (including *miscanthus giganteus* and other varieties of the genus *miscanthus*), giant reed (*arundo donax*), energy cane (*saccharum* spp.), and napier grass (*pennisetum purpureum*). These energy crops are grown for the specific purpose of producing energy from all or part of the resulting plant. As non-limiting examples, switch grass and miscanthus are energy crops that regenerate naturally following a full periodic harvest, for example, an annual harvest.

Systems and methods according to the embodiments of the disclosure align the cost of planting a long-term primary crop with the economic returns of harvesting a combination of the primary crop and the energy crop. In embodiments where the primary crop is a tree crop, the primary crop may be harvested to make wood products such as lumber, wood chips, pulp for cellulosic products, etc. The energy crop may be harvested as appropriate for the production of heat, electric power, other combustible power, and/or for conversion to transportation fuels and other useful energy products. Accordingly, methods according to the disclosure include periodically harvesting the energy crop as well as harvesting the primary crop. In some embodiments, systems and methods according to the disclosure are expected to reduce the amount of tillage necessary for such harvesting.

Words in the above disclosure using the singular or plural number may also include the plural or singular number, respectively. For example, use of the term "soil component" could also apply to and "soil components." Likewise, use the term "filtering mechanism" could also apply to and "filtering mechanisms."

While the plot of land 100 in the illustrated embodiments of FIGS. 4-8 is shown to be planted with at least two crops: a primary crop 102 and an energy crop 602, it should be appreciated that planting the plot of land 100 with more than two crops is also within the scope of the present disclosure. Further, specific types of crops not explicitly disclosed that would be obvious to a person of ordinary skill in the art are envisioned to be within the scope of the disclosure.

From the foregoing, it will be appreciated that the specific embodiments of the disclosure have been described herein for purposes of illustration, but that various modifications may be made without deviating from the disclosure. For example, dimensions of the components of soil treating systems in the disclosure may be modified given tolerances acceptable to a person of ordinary skill in the art. Aspects of the disclosure described in the context of particular embodiments may be combined or eliminated in other embodiments. For example, aspects relating to embodiments having an inverted V-type shearing assembly may be combined or eliminated with aspects relating to embodiments having a non-inverted V-type shearing assembly. Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the invention is not limited except as by the appended claims.

We claim:

1. A soil treating system comprising:
   a movement assembly having a front end and a back end;
   a shearing assembly mounted on the front end of the movement assembly, the shearing assembly comprising:
      a frame having two opposing sides;
      a substantially V-shaped cutting blade having an apex, the substantially V-shaped cutting blade arranged on the frame between the two opposing sides so that the apex points towards the movement assembly; and
      a filtering mechanism mounted on the frame behind the substantially V-shaped cutting blade, the filtering mechanism being configured to filter soil and plantation debris;
   a leveling assembly mounted on the back end of the movement assembly.

2. The soil treating system of claim 1 wherein the shearing assembly further comprises a deflector mounted on the frame behind the substantially V-shaped cutting blade, the deflector being configured to deflect soil and plantation debris onto the soil filtering mechanism.

3. The soil treating system of claim 1 wherein the substantially V-shaped cutting blade is a serrated cutting blade.

4. The soil treating system of claim 1 wherein the leveling assembly comprises:
   one or more mounting assemblies; and
   a plurality of grading devices attached to the each of the one or more mounting assemblies, the plurality of grading devices being disposed angularly with respect to one another in a configuration to effect grading of soil;
   wherein each of the one or more grading devices are selected from the group consisting of blades and rakes.

5. The soil treating system of claim 1 wherein the filtering mechanism comprises a screen having one or more openings, the one or more openings being large enough to allow soil to pass through the screen and small enough to prevent plantation debris from passing through the screen.

6. The soil treating system of claim 1 wherein the filtering mechanism further comprises one or more plantation debris discharge devices configured to remove plantation debris from the filtering mechanism.

7. The soil treating system of claim 1 wherein the shearing assembly and the leveling assembly are each detachable from the movement assembly.

8. The soil treating system of claim 1 wherein the movement assembly is a prime mover or a tractor.

9. A soil treating system comprising:
   a movement assembly having a front end and a back end;
   a shearing assembly mounted on the front end of the movement assembly, the shearing assembly comprising:
      a blade mounting assembly;
      a substantially V-shaped serrated cutting blade having an apex, the substantially V-shaped serrated cutting blade arranged on the blade mounting assembly so that the apex points towards the movement assembly; and
   a leveling assembly mounted on the back end of the movement assembly, the leveling assembly comprising a plurality of grader blades, the plurality of grader blades being positioned to effect grading of the soil.

10. The soil treating system of claim 9 wherein the plurality of grader blades are disposed angularly with respect to one another.

11. The soil treating system of claim 9 wherein the shearing assembly and the leveling assembly are each detachable from the movement assembly.

12. The soil treating system of claim 9 wherein the movement assembly is a prime mover or a tractor.

13. A shearing assembly comprising:
   a frame having two opposing substantially parallel sides, the frame configured to attach to a front of a mechanism for moving the shearing assembly;
   a substantially V-shaped cutting blade mounted on the frame between the two opposing substantially parallel sides; and
   a bar arranged between the two opposing substantially parallel sides of the frame behind the substantially V-shaped cutting blade;
   wherein the substantially V-shaped cutting blade has an apex and the substantially V-shaped cutting blade is arranged on the frame so that the apex points toward the bar.

14. The shearing assembly of claim 13, further comprising a filtering mechanism mounted on the frame behind the substantially V-shaped cutting blade, the soil filtering mechanism being configured to separate soil and plantation debris.

15. The shearing assembly of claim 14, further comprising a deflector mounted on the frame behind the substantially V-shaped cutting blade, the deflector being configured to deflect soil and plantation debris onto the filtering mechanism.

16. The shearing assembly of claim 14 wherein the frame further comprises one or more plantation debris discharge devices configured to remove plantation debris from the filtering mechanism.

17. The shearing assembly of claim 14 wherein the filtering mechanism comprises a screen having one or more openings, the one or more openings being large enough to allow soil to pass through the screen and small enough to prevent plantation debris from passing through the screen.

18. The shearing assembly of claim 13 wherein the substantially V-shaped cutting blade is a serrated cutting blade having a plurality of teeth.

19. The shearing assembly claim 13, further comprising one or more connection mechanisms mounted on the bar, the one or more connection mechanisms being configured to mount the shearing assembly on a movement assembly.

* * * * *